United States Patent [19]

Ahmed et al.

[11] Patent Number: 5,239,002
[45] Date of Patent: Aug. 24, 1993

[54] POLYMERIC ADHESIVE AND ANTI-CORROSION AGENTS

[75] Inventors: Iqbal Ahmed; Timothy W. Johnson; Henry L. Hsieh, all of Bartlesville, Okla.

[73] Assignee: Phillips Petroleum Company, Bartlesville, Okla.

[21] Appl. No.: 568,109

[22] Filed: Aug. 16, 1990

[51] Int. Cl.$^5$ .................................. C08F 4/44
[52] U.S. Cl. ............................. 525/150; 525/189; 525/537; 525/540; 526/258; 526/265
[58] Field of Search ............... 525/189, 537, 150, 540; 526/258, 265

[56] References Cited

U.S. PATENT DOCUMENTS

| | | | |
|---|---|---|---|
| 3,894,983 | 7/1975 | Higbee | 260/37 R |
| 4,017,450 | 4/1977 | Bailey | 260/37 R |
| 4,115,344 | 9/1978 | Brady | 260/37 R |
| 4,451,582 | 5/1984 | Denzinger et al. | 526/284 |
| 4,746,698 | 5/1988 | Kouyama et al. | 524/396 |
| 4,748,169 | 5/1988 | Izutsu et al. | 525/189 |
| 4,833,022 | 5/1989 | Bridges et al. | 428/337 |
| 4,916,179 | 4/1990 | Vives | 524/421 |

FOREIGN PATENT DOCUMENTS

| | | | |
|---|---|---|---|
| 62-252448 | 11/1987 | Japan | 525/189 |
| 1300004 | 12/1972 | United Kingdom . | |

OTHER PUBLICATIONS

J. Polym. Sci. Polym. Chem. Ed. 13:161-170 (1975) "Copolymerization Behavior of Vinylimidazolium Salts".

Primary Examiner—Melvyn I. Marquis
Assistant Examiner—Mark Sweet
Attorney, Agent, or Firm—David L. Kinsinger

[57] ABSTRACT

In the adhesion of metallic materials to polymers, new adhesive agents of nitrogen containing hetrocyclic polymers such as compositions of imidazole-pyrridine, pyrrolidone-pyridine, and imidazole-pyrrolidone solutions have been discovered as useful. These agents also exhibit anti-corrosion effects. Adhesion and/or reduction of anti-corrosion can be accomplished by pre-coating the metal material with at least one of these agents prior to applying the polymer, or by preblending the polymer with at least one of these agents followed by applying the blend to the metal, under suitable conditions.

8 Claims, No Drawings

POLYMERIC ADHESIVE AND ANTI-CORROSION AGENTS

BACKGROUND OF THE INVENTION

This invention relates to polymeric bonding or adhesive agents and to anti-corrosion agents. In one specific aspect, this invention relates to new polymeric compositions useful as adhesive agents and as anti-corrosion agents. In another specific aspect, this invention relates to methods of using these new polymeric compositions.

Poly(arylene sulfide) resins, hereinafter referred to as PAS, are known in the art for their high temperature stability and applications. It is generally known in the art that polymers can be bonded or adhered to metallic substrates. However, PAS polymers generally show poor adhesion to metals. Efforts to improve the adhesion of PAS to metals are known in the art. Unfortunately, these efforts have not been entirely successful.

Properly adhered polymers exhibit stability of adhesion and are useful in several applications including electrical feedthrough, encapsulation, wire coating, capacitor and circuit boards.

Ordinary metal corrosion and polymer induced metal corrosion are also known in the art. Such polymer induced corrosion occurs during injection molding of polymers, when polymer is contacted with metals, and in numerous other undesirable circumstances. It is known from the prior art that metal oxides, hydroxides, carbonates, carboxylates, and ammonia precursors are useful as inhibitors of polymer associated corrosion. However, in applications that require very high temperatures, some or all of these agents may be unsuitable. Thus, the need still exists to develop an effective anti-corrosion agent that has high thermal stability.

OBJECTS OF THE INVENTION

It is an object of this invention to provide anti-corrision, and adhesive agents having high thermal stability for polymers-metal adhesion.

It is another object of this invention to provide a novel coated article having good adhesion and anti-corrosion properties.

It is yet a further object of this invention to provide an improved polymer coating process.

In accordance with this invention, polymers of tertiary nitrogen hetrocyclic polymers are used to improve the adhesion and anti-corrosion properties of other (beneficiary) polymers, and to make articles comprising of these ingredients.

DETAILED DESCRIPTION OF THE INVENTION

In very generalized terms, the practice of this invention involves the following steps, using polymers made by polymerizing combinations of suitable monomers of nitrogen containing compounds. Suitable solutions of these nitrogen containing polymers can be made in a suitable solvent, followed by applying these solutions to metallic surfaces and/or objects. This application step can be accomplished for instance, by precoating the metal with the nitrogen containing polymer solution followed by the application of a suitable beneficiary polymer. Alternatively, the nitrogenous polymer and a suitable beneficiary polymer can be blended followed by applying the blend to metallic surfaces or objects.

Generally speaking, beneficiary polymers include all polymers with the exception of the additive nitrogen containing polymers. Preferred polymers to be benefitted by the practice of this invention however, are normally solid poly(arylene sulfides) and other sulfur containing polymers. PAS is well known in the art, and can be made by employing the method(s) described in the following illustrative patents. U.S. Pat. Nos. 3,354,129; 2,513,188; 3,699,089; and 3,919,177. Most particularly preferred of the PAS polymers is poly(phenylene sulfide) hereinafter referred to as PPS. PPS is commercially available as "RYTON ® PPS" a registered trademark of Phillips 66 Company.

All metals and objects formed from them are generally suitable for the practice of this invention. It is preferred that these metals be readily oxidizable. Preferred amongst the family of metals, are the Group 1B elements of the periodic table and their alloys. This group includes copper, silver, and gold. The most preferred metal is copper and alloys of copper.

Generally speaking, homopolymers and copolymers of all tertiary nitrogen containing hetrocyclic compounds are suitable in the practice of this invention. By tertiary nitrogen containing hetrocyclic polymer (hereinafter referred to as nitrogen containing polymer) is meant homopolymers and copolymers of two or more of the hetrocyclic nitrogen containing monomers described herein. Examples of such polymers include polyvinylimidazoles, polybenzimidazole, polyvinylpyrrolidone, polyvinylpyridine, poly(2-vinylquinoline), poly(N-vinyl-co-N-vinylpyrrolidone), poly(N-vinylimidazole-co-4-vinylpyridine), poly(N-vinylpyrrolidone-co-4-vinylpyridine) and similar compounds. Preferred are polymers and copolymers of the imidazoles, pyrrolidones, and pyridines.

Examples of imidazole monomers suitable for preparing the polymers useful in the practice of this invention include but are not limited to N-vinylimidazole; N-alkyl-4-vinylimidazole; N-alkyl-5-vinylimidazole, 2-alkyl-1-vinylimidazole, 2-vinylimidazole, and 4(5)-vinylimidazole. N-vinylimidazole is preferred.

Examples of pyrridine monomers suitable for preparing the polymers useful in the practice of this invention include but are not limited to N-vinylpyridine, 4-vinylpyridine, and 2-vinylpyridine. 4-vinylpyridine is preferred.

Likewise, examples of pyrrolidone monomers suitable for preparing the polymers useful in the practice of this invention include but are not limited to N-vinylpyrrolidones, N-vinyl-5-methyl-2-pyrrolidone, N-vinyl-3,3,5-trimethyl-2-pyrrolidone, vinylcaprolactam, N-vinylbenzylpyrrolidone, and acryloxy-succinimide. N-vinylpyrrolidone is preferred.

In the actual practice of this invention, the useful beneficiary polymers, nitrogen containing polymers (and/or the monomers used to make them) metal(s), and other auxiliary ingredients needed, can be readily commercially obtained. The monomers, such as N-vinylimidazole and N-vinylpyrrolidone, are polymerized to their respective homopolymers and/or copolymers using conventional methods known in the art. For example, the polymerization can be done in water or in a hydrocarbon solvent such as toluene or benzene, in the presence of a free radical initiator, such as azobis(isobutyronitrile) (AIBN) or 4,4'-azobis(4-cyanovaleric acid) (ACVA). At the completion of this polymerization reaction, it is recommended that the polymer formed be washed with an appropriate solvent, and dried under vacuum at 60° C. for about 24 hours. When the monomer is a pyridine, ethanol qualifies as an appropriate solvent. Likewise, when the monomer is pyrrolidone or imidazole, toluene qualifies as an appropriate solvent.

The nitrogen containing polymer can be coated on to the metal by using a solution of the polymer, a melt of the polymer, or by any other suitable means known in the art. When a solution of the polymer is to be used, a minimum concentration of about 0.5% is required; although solutions with concentrations of up to about 1% have also been found to be effective as adhesion agents. Solutions of these polymers can be made by introducing the polymer into suitable solvents, followed by stirring for a period of time at about room temperature. The solutions so formed should preferably be left for a period of time, preferably for about 24 hours prior to application. Examples of suitable solvents as used herein, includes water, iso-propanol, dimethyl formamide (DMF) and ethanol. Ethanol is the preferred solvent.

The metallic articles or objects to be used can be prepared by degreasing, cleaning, and drying their surfaces. Cleaning can be accomplished by washing with a surface active agent such as a nonionic surfactant and 0.1% sodium hydroxide, trichloroethylene, acetone, or other similar cleaners or solvents. This is followed by rinsing with water, treating with a dilute inorganic acid, preferably dilute hydrochloric acid or sulfuric acid, then rinsing with distilled water. The surfaces so cleaned can then be dried by air drying, wiping the surfaces dry or otherwise drying the surfaces by any suitable method.

Alternatively, the nitrogen containing polymer can be blended with the beneficiary polymers by means of solution blending, melt blending, or other suitable conventional techniques known in the art. In these instances, it is required that a minimum of about 1.5 weight percent to a maximum of about 3 weight percent of the nitrogen containing polymer be used. This means that the minimum amount of beneficiary polymer required is about 97 weight percent, to a maximum of about 98.5 weight percent, based on the combined weight of the nitrogen containing polymer and the beneficiary polymer(s).

Regarding the copolymer compositions, the following molar ratios are suggested. For an imidazole:pyrrolidone combination, a broad molar ratio of 50-99:50-1 mole:mole, a preferred molar ratio of 70-99:30-1; and a distinctly preferred molar ratio of 70:30 mole:mole. For an imidazole:pyrridine combination, a broad molar ratio of 70-99:30-1 mole:mole and a preferred molar ratio of 80:20 mole:mole are useful. For vinylpyrrolidone:pyridine combination, a broad molar ratio of 70-99:30-1 is useful, while a 70:30 mole:mole ratio is preferred.

There are, at least, two general methods of using the nitrogen containing polymers in the practice of this invention in order to accomplish its adhesive and anti-corrosion effects.

One method involves coating cleaned and treated metal surfaces with a nitrogen containing polymer. The coated metal is optionally rinsed with a solvent such as ethanol, and is then molded with at least one beneficiary polymer such as PPS, in a molding machine.

Another method involves blending a nitrogen containing polymer with a beneficiary polymer, such as PPS. The blend can be coated on the metal by using any method known in the art such as fluidized bed coating, extrusion coating, lamination in a press or rotational molding.

The degree of adhesion of the beneficiary polymer to the metal can then be measured, if desired, by using conventional tests. A recommended test is the wire-pull out test which is similar to the testing procedure disclosed in ASTM #D4562-86. An alternative test is the foil peel test.

With both methods, the anti-corrosion effect of the nitrogen containing polymer was observed qualitatively as disclosed in Example VI. It was noticed that both color formation and particle formation on metal surfaces which are evidence of corrosion, was substantially reduced.

The following illustrative examples and tables further detail the various aspects of this invention.

EXAMPLE I

This example illustrates a process for preparing the nitrogen containing homopolymers to be used in this invention.

(1) Poly(N-vinylimidazole): A solution of freshly distilled N-vinylimidazole (15 g, 0.16 mol) and azobis(isobutyronitrile) (0.126 g, $7.65 \times 10^{-4}$ mol) in 25 g toluene was taken in a 10 oz pop bottle. The bottle was capped and degassed by bubbling with nitrogen for 15 minutes. The bottle was then placed in a water bath thermostated at 60° C. and was agitated mildly for two days. The white precipitated homopolymer was collected by filtration, washed thoroughly with toluene and dried in a vacuum oven (30 mm Hg) at 60° C. for 24 hours. The yield was >13.5 g (>90% conversion).

(2) Poly(N-vinylpyrrolidone): A solution of freshly distilled N-vinylpyrrolidone (15 g, 0.135 mol) and azobis(isobutyronitrile) (0.11 g, $6.70 \times 10^{-4}$ mol) in 25 g toluene was taken in a 10 oz pop bottle. The bottle was capped and degassed by bubbling with nitrogen for 15 minutes. It was then placed in an agitating waterbath thermostated at 60° C. and was agitated mildly for two days. The rubbery polymeric material was separated from the solvent and washed with toluene thoroughly. The homopolymer was then dissolved in water and was coagulated and washed with acetone. It was dried in a vacuum oven (30 mm Hg) at 60° C. for two days. The yield was >12.7 g (>84.5% conversion).

(3) Poly(4-vinylpyridine): A solution of 4-vinylpyridine (15 g, 0.143 mol) and azobis(isobutyronitrile) (0.12 g, $7.31 \times 10^{-4}$ mol) in 30 g ethanol was taken in a 10 oz pop bottle. The bottle was capped and degassed by bubbling with nitrogen for 15 minutes. It was then placed in an agitating waterbath thermostated at 60° C. and was agitated mildly for two days. The homopolymer was coagulated from the viscous solution so formed with acetone, washed thoroughly and dried in a vacuum oven (30 mm Hg) at 60° C. for 24 h. The yield was >14 g (>93 percent conversion).

EXAMPLE II

Copolymer Preparation

This example illustrates a process for preparing the nitrogen containing copolymers to be used in this invention.

(1) Poly(N-vinylimidazole-co-N-vinylpyrrolidone): A 40 g solution containing 15 g monomer mixture in varying mol ratios in 25 g toluene and 0.48 mol percent azobis(isobutyronitrile) was taken in a 10 oz pop bottle. The bottle was capped and degassed by bubbling with nitrogen for 15 minutes. It was then placed in an agitating waterbath thermostated at 60° C. and was agitated mildly for two days. The precipitated copolymer was collected by filtration, washed thoroughly with toluene and dried in a vacuum oven (30 mm Hg) at 60° C. for two days. The yield was >13 g (>86% conversion).

(2) Poly(N-vinylimidazole-co-4-vinylpyridine): A 40 g solution containing 15 g monomers mixture of varying molar ratios in 25 g toluene and 0.48 mol percent azobis-(isobutyronitrile) was taken in a 10 oz pop bottle. The bottle was capped and degassed by bubbling with nitrogen for 15 minutes. It was then placed in an agitating water bath thermostated at 60° C. and was agitated mildly for two days. The precipitated copolymer was dissolved in ethanol. The solvent was evaporated in a forced air oven from a plastic pan. The solid copolymer was repeatedly washed with toluene and finally with acetone. It was then dried in a vacuum oven (30 mm Hg) at 60° C. for two days. The conversion was >80%.

(3) Poly(N-vinylpyrrolidone-co-4-vinylpyridine): A 40 g solution containing 15 g of monomer mixture of varying molar ratios in 25 g ethanol and 0.49 mol % azobis(isobutyronitrile) was taken in a 10 oz pop bottle. The bottle was capped and degassed by bubbling with nitrogen for 15 minutes. It was then placed in an agitating water bath thermostated at 60° C. and was agitated mildly for two days. An emulsion-like liquid was obtained. The solid copolymer was obtained by evaporating the solvent from the emulsion-like liquid in a forced air oven. The solid copolymer was washed with toluene and dried in a vacuum oven (30 mm Hg) at 60° C. for 24 hours.

EXAMPLE III

Preparation of PPS Molded Copper Wire and Pull-Out Test for Adhesion

This example illustrates a precoating method of practicing this invention to achieve greater adhesion of metals to beneficiary polymers.

(1) Nitrogen containing polymer solutions (NCPS): a 0.5% polymer solution was prepared by stirring the polymer in ethanol at room temperature for 24 hours.

(2) Wire cleaning: copper wire (0.04" diameter, typically 2¼" long) was washed with a 0.1% "TRITON ® X-100" and 0.1% NaOH mixture, rinsed with deionized water and finally treated with dilute HCl followed by rinsing with deionized water.

(3) Wire treatment with nitrogen containing polymer solution: Copper wire immediately after cleaning operation was coated with NCPS by boiling the wire in the solution for 5 minutes and then rinsed once with ethanol at room temperature. The treated copper wire allowed to dry in air before molding with PPS.

(4) Preparation of molded copper wire: Sections of copper wire precoated with the nitrogen containing polymer solution were molded with PPS in a Newbury vertically clamping press in a mold which forms a coaxial concentric cylinder of plastic on the wire. Such molds are used for encapsulation of axial-leaded resistors and diodes. The extruder barrel temperature was 625° F., and the mold was maintained at 150° C. An injection pressure of 4500 PSI was used. The dimensions of the molded plastic cylinder were 0.115" diameter and 0.250" long. The molded assembly was annealed at 200° C. for 2 hours.

(5) Testing: Mechanical testing of the wire pull-out samples was accomplished by using an Instron test machine. The test fixture consisted of a yoke with a vertical hole in it to accomodate the molded wire. The assembly under test was fed into the hole, until the plastic portion bottomed out against a machined flat. The wire which protruded from the other end of the hole was gripped by the Instron jaws and the sample was pulled. A trace of force versus displacement was recorded and the force at breakaway was noted. Pull-out forces were converted to shear stresses at failure by dividing them by the geometrical interfacial area. A minimum of five tests were made in each sequence, i.e., as-molded and annealed for each of the inventive compositions, and tests averages with standard deviation (SD) are reported.

The test results of N-vinylimidazole and N-vinylpyrrolidone homopolymers and their copolymers treated wires are summarized in Table I. The table's results show that inventive homopolymer and copolymer treatment of copper surfaces substantially improved adhesion of PPS to copper, especially when compared to bare copper or to copper treated with benzotriazole (a reference adhesive agent/stabilizer). For example, sample #4 in Table I shows adhesion improvement of more than 700% and 69% in comparison to bare copper and benzotriazole treated copper respectively, in the as-molded sequence.

TABLE I

Wire Pull-out Tests
(Wire was coated with N-vinylimidazole/N-vinylpyrrolidone copolymers and then molded with PPS)

| Sample # | Nitrogen Containing Polymer[a] mol % | Bond Strength As-molded | (Ksi ± SD) Annealed |
|---|---|---|---|
| bare copper wire | (control) | 0.15 | 0.30 |
| copper wire treated with benzotriazole (reference) | | 0.75 ± 0.09 | 0.46 ± 0.08 |
| 1 | NVP = 100 | 0.97 ± 0.06 | 0.64 ± 0.03 |
| 2 | NVI = 100 | 0.78 ± 0.18 | 0.67 ± 0.08 |
| 3 | NVI = 90 NVP = 10 | 1.01 ± 0.11 | 0.72 ± 0.05 |
| 4 | NVI = 50 NVP = 50 | 1.27 ± 0.13 | 0.71 ± 0.05 |

[a]Amount of nitrogen containing polymer composition used is based on polymerization feed.
NVI is N-vinylimidazole.
NVP is N-vinylpyrrolidone.

EXAMPLE IV

Preparation of Molded Copper Panel and Peeling Tests for Adhesion

This example illustrates a preblending method for practicing this invention to achieve greater adhesion of metals to beneficiary polymers.

(1) Cleaning of copper foils: Copper foils (8"×8") were first immersed in an aqueous solution of 0.1% "TRITON ® X-100" and 0.1% NaOH at 50° C. for 30–60 minutes. Then the foils were rinsed with deionized water. Following this treatment, the copper foils were further treated with 10% aqueous $H_2SO_4$ for 5 to 10 minutes, rinsed with deionized water, finally with acetone and dried with a nitrogen stream. The cleaned foils were used for PPS molded panels.

(2) Preparation of PPS and nitrogen containing polymer: Ethanolic promoter solution was prepared by stirring the polymer in ethanol at selected concentrations at room temperature for 24 hours. 50 g of dry PPS (dried at 150° C. for 1½ hours) was thoroughly mixed with 105 g of nitrogen containing polymer solution. Then the solvent was first evaporated in forced air oven and the blend was finally dried at 150° C. for 1½ hours. A control was prepared by treating the PPS with ethanol only.

(3) Preparation of molded copper panels: 50 g of the nitrogen containing polymer/PPS (1.5/100 wt/wt) blend was placed between two cleaned copper foils; a square "picture frame" spacer 0.062" thick, 8"×8" outer dimensions, 6×6" inner dimensions was used to define the thickness and lateral dimensions of the panel. Aluminum and steel plates were used in either side of the panel during molding. The sample was placed in the press which had been preheated to 320° C., for 4 minutes. The press was closed to contact. After 1.5 minutes the polymers had partially melted, and the press was closed incrementally to re-establish contact. After 5 minutes the press was closed and compressed to 15,000 lb load, for 3 minutes. Thereafter, the hot press was opened and the compressed panel was then transferred to a water-cooled press and compressed under 20,000 pound load for 3 minutes. The panel was then removed from the mold and annealed at 150° C. for 1½ hours. Peel testing was carried out on ½" wide strips according to the IPC procedure 2.4.8 of IPC-TM-650.

Each sample of ½" wide and 3" long was clamped on a horizontal surface with a pre-peeled metal strip end projecting upward for 1". The end of the strip was gripped between the jaws of the clamp. The jaws covered the full width of the metal strip and was parallel to the line of peel. The force in a vertical plane was exerted so that the metal foil was pulled at a rate of 2" per minute. A trace of load in pound versus deflection in inches was recorded. The average of three tests for each polymer composition was recorded as peel strength.

The peel strength, which indicates the adhesive effects of the various nitrogen containing polymer compositions are summarized in Tables II–IV. It is evident from these tables that use of the nitrogen containing polymer composition substantially improved PPS-copper adhesion. For example, the results of sample numbers 7, 11, and 19 in PPS blend, show an improved PPS-copper adhesion by more than 247%, 58% and 20% respectively, in comparison to PPS-copper only.

TABLE II

IPC Peel Strength (nitrogen containing polymer composition[a] comprising of N-vinylimidazole/N-vinylpyrrolidone was blended with PPS and then the blended resin[b] was molded between two copper plates)

| Sample # | Nitrogen Containing Polymer Composition[a] mol % | Peel Strength (Annealed) lb/inch |
|---|---|---|
| | PPS (GR01) Control | 0.84 |
| 6 | NVI = 80 NVP = 20 | 1.46 |
| 7 | NVI = 70 NVP = 30 | 2.92 |
| 8 | NVI = 60 NVP = 40 | 1.28 |
| 9 | NVI = 30 NVP = 70 | 1.12 |

[a]Amount of nitrogen containing polymer is based on polymerization feed.
[b]1.5 weight percent of the nitrogen containing polymer composition was used in this blend.
NVI is N-vinylimidazole
NVP is N-vinylpyrrolidone

TABLE III

IPC Peel Strength (nitrogen containing polymer composition[a] comprising N-vinylimidazol/4-vinylpyridine copolymer was blended with PPS and then the blended resin[b] was molded between two copper plates)

| Sample # | Nitrogen Containing Polymer Composition[a] mol % | Peel Strength (Annealed) lb/inch |
|---|---|---|
| | PPS(GR01) Control | 0.84 |
| 10 | NVI = 90 4VP = 10 | 0.99 |
| 11 | NVI = 80 4VP = 20 | 1.33 |
| 12 | NVI = 70 4VP = 30 | 1.08 |
| 13 | NVI = 60 4VP = 40 | 1.04 |

[a]Amount of nitrogen containing polymer composition is based on polymerization feed.
[b]1.5 weight percent of the nitrogen containing polymer composition was used in this blend.
NVI is N-vinylimidazole
4VP is 4-vinylpyridine

TABLE IV

IPC Peel Strength (nitrogen containing polymer composition[a] comprising N-vinylpyrrolidone/4-vinylpyridine copolymer was blended with PPS and then the blended resin[b] was molded between two copper plates)

| Sample # | Nitrogen Containing Polymer Composition[a] mol % | Peel Strength (Annealed) lb/inch |
|---|---|---|
| | PPS (PR10 X-2) control | 3.80 |
| 14 | NVP = 100 | 4.18 |
| 15 | 4VP = 100 | 2.24 |
| 16 | NVP = 95 4VP = 5 | 4.04 |
| 17 | NVP = 90 4VP = 10 | 4.40 |
| 18 | NVP = 80 4VP = 20 | 3.96 |
| 19 | NVP = 70 4VP = 30 | 4.56 |

[a]Amount of nitrogen containing polymer composition based on polymerization feed.
[b]1.5 weight percent of the nitrogen containing polymer composition was used in the blend.
NVP is N-vinylpyrrolidone
4VP is 4-vinylpyridine

EXAMPLE V

Effects of Concentration of Inventive Composition in the PPS Blend

This example illustrates the concentration of nitrogen containing polymer in the PPS blend needed to improve the PPS/metal adhesion.

Six PPS-nitrogen containing polymer composition blend moled copper panels in varying concentrations were prepared by the method described in Example IV. Peeling strength was determined in each case and is given in Table V. A maximum of 3 weight percent of the nitrogen containing polymer composition was needed to improve PPS-copper adhesion for this particular PPS brand.

TABLE V

Effect of concentration of nitrogen containing polymer on the peeling strength of PPS blend to copper

| Sample # | Nitrogen Containing Polymer Composition mol % | Peel Strength (lb/inch) Concentration in the blend (PPS PR10X-2) | | | |
|---|---|---|---|---|---|
| | | 0% | 1.5% | 3% | 4.9% |
| 20 | NVP = 80 4VP = 20 | 3.80 | 3.96 | 4.08 | 2.76 |
| 21 | NVI = 70 | 3.80 | 2.98 | 4.20 | 3.82 |

TABLE V-continued

Effect of concentration of nitrogen containing polymer on the peeling strength of PPS blend to copper

| Sample # | Nitrogen Containing Polymer Composition mol % | Peel Strength (lb/inch) Concentration in the blend (PPS PR10X-2) | | | |
|---|---|---|---|---|---|
| | | 0% | 1.5% | 3% | 4.9% |
| | NVP = 30 | | | | |

NVP is N-vinylpyrrolidone
NVI is N-vinylimidazole
4VP is 4-vinylpyridine

EXAMPLE VI

Effect of Heating on Nitrogen Containing Polymer Treated Copper in Presence of PPS This example illustrates the color changes on heating of treated copper which are indicative of metal corrosion.

(1) Preparation of copper surface: Several copper strips of dimension 1¾" by 0.5" were cut. These were cleaned in a similar manner as described in Example IV.

(2) Coating the copper strips: The cleaned copper strips were rinsed with ethanol and were immersed in ethanolic nitrogen containing copolymer solution (1%). The metal strips were boiled for 5 minutes followed by rinsing once with ethanol at room temperature. These were allowed to dry in air at room temperature. A blank and two reference strips (treated with 1.5% ammonia solution and 1% acetone solution of benzotriazole respectively) were also prepared.

(3) Heating: The coated strips were put in a stoppered tube together with about 0.5 g dry PPS powder (dried at 150° C. for 1 hour). The tube was then heated at 150° C. and observed color changes were recorded at 24 hours and at 48 hours intervals. The results are summarized in Table VI.

For most of the copper strips coated with the nitrogen containing polymer composition, no color changes were observed. Only a slight or negligible color change was observed for one of the nitrogen containing polymer composition, NVP/4-VP. In contrast to this, for the bare copper strip, and the copper strip coated with benzotriazole, varying degrees of color changes were observed.

This example permits the conclusion that the nitrogen containing polymer composition is effective as an anticorrosion agent.

TABLE VI

Effect of heating in the presence of PPS on nitrogen containing polymer treated copper

| Coating Material | Color Changes | | Corrosion Ratings | |
|---|---|---|---|---|
| | 24 hour | 48 hour | 24 hour | 48 hour |
| Blank | yellowish gray mixed w/violet | more yellowish | severe | severe |
| Ammonia Solution | violet & gray | violet & yellowish gray | severe | severe |
| Benzotriazole | violet, gray & yellow mixed | more yellowish gray & violet | extensive | extensive |
| NVI/NVP (50/50 mol) copolymer | no change | no change | none | none |
| NVI/NVP (70/30 mol) copolymer | no change | no change | none | none |
| NVI/4-VP (80/20 mol) copolymer | no change | no change | none | none |
| NVP/4-VP (80/20 mol) copolymer | very faint violet | some faint gray | slight | slight |

NVI is N-vinylimidazole
NVP is N-vinylpyrrolidone
4-VP is 4-vinylpyridine

While this invention has been described in detail for the purpose of illustration, it is not to be construed as limited thereby but is intended to cover all changes and modifications within the spirit and scope thereof.

That which is claimed is:

1. A composition comprising poly(arylene sulfide) and a tertiary nitrogen hetrocyclic polymer wherein said tertiary nitrogen hetrocyclic polymer is selected from the group consisting of imidazoles, pyrrolidones, pyridines, and mixtures thereof and wherein said tertiary nitrogen hetrocyclic polymer is present in an amount within the range of about 1.5 to about 3 weight percent, and said poly(arylene sulfide) is present in an amount within the range of about 98.5 to about 97 weight percent.

2. A composition as in claim 1 wherein said tertiary nitrogen hetrocyclic polymer comprises N-vinylimidazole.

3. A composition as in claim 1 wherein said poly(arylene) is poly(phenylene sulfide).

4. A composition as in claim 3 wherein said tertiary nitrogen hetrocyclic polymer is N-vinylimidazole-N-vinylpyrrolidone.

5. A composition as in claim 4 wherein a molar ratio of said N-vinylimidazole to said N-vinylpyrrolidone is within the range of 50:50 to 99:1.

6. A composition as in claim 3 wherein said tertiary nitrogen hetrocyclic polymer is N-vinylimidazole-4-vinylpyrridine.

7. A composition as in claim 6 wherein a molar ratio of said N-vinylimidazole to said N-vinylpyridine is within the range of 70:30 to 99:1.

8. A composition as in claim 3 wherein said tertiary nitrogen hetrocyclic polymer is N-vinylpyrrolidone-4-vinylpyridine.

* * * * *